June 9, 1925.  J. A. AMOS  1,541,094

LENS HOLDER

Filed June 9, 1924

INVENTOR
John A. Amos
BY E. E. Huffman
ATTORNEY

Patented June 9, 1925.

1,541,094

UNITED STATES PATENT OFFICE.

JOHN A. AMOS, OF ST. LOUIS, MISSOURI, ASSIGNOR TO OLIVER ELECTRIC AND MANUFACTURING COMPANY, OF ST. LOUIS, MISSOURI, A CORPORATION OF MISSOURI.

LENS HOLDER.

Application filed June 9, 1924. Serial No. 718,764.

*To all whom it may concern:*

Be it known that I, JOHN A. AMOS, a citizen of the United States of America, residing at the city of St. Louis, State of Missouri, United States of America, have invented a certain new and useful Lens Holder, of which the following is such a full, clear, and exact description as will enable any one skilled in the art to which it appertains to make and use the same, reference being had to the accompanying drawings, forming part of this specification.

My invention relates to means for holding a light transmitting glass (herein referred to for convenience as a "lens" although it may or may not be so shaped as to refract light) in a supporting frame and its object is to produce a convenient inexpensive structure for this purpose which, while embodying a resilient member, will not apply pressure to the lens either in normal use or during the operation of applying it.

Figure 1:
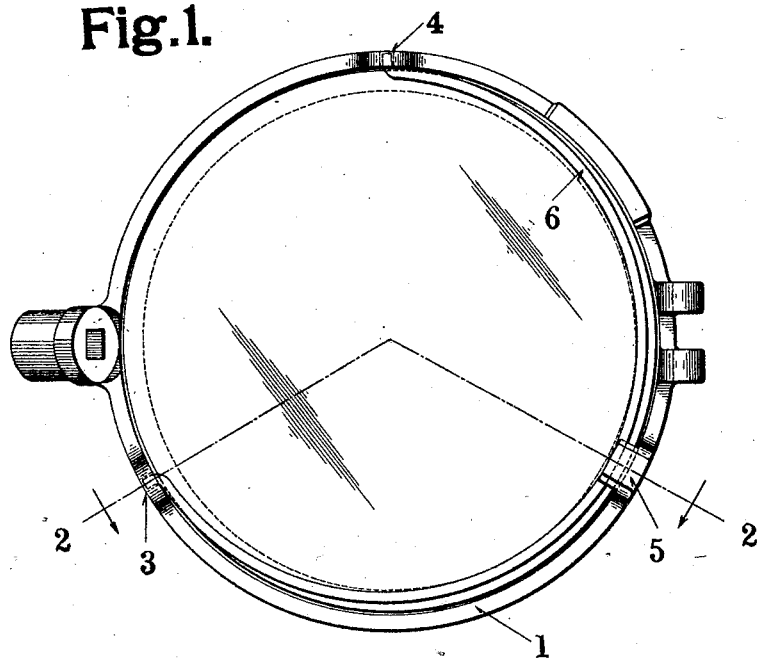
Figure 2:
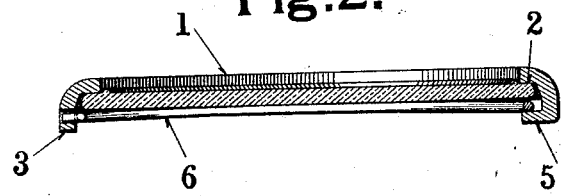

In the accompanying drawings, which illustrate the application of my invention to one of the parts of a "throw over" device in a railroad classification lamp whereby colored glasses or lenses may be placed in or withdrawn from the light path, Figure 1 is a side elevation view; and Figure 2 is a cross-sectional view along the line 2—2' of Figure 1.

The lens frame 1, which is preferably a casting, is provided with a lens seating flange 2 as shown, and with integral lugs 3, 4 and 5 on its rear edge. The lugs 3 and 4 have transverse openings therein to receive the bent ends of lens retaining member 6, preferably formed of resilient wire. This retaining member is of a shape to substantially conform to the shape of the lens frame, and the lug 5 is provided with a laterally projecting portion adapted to extend over the member 6 at a point intermediate its ends. The openings in lugs 3 and 4 and the under surface of the projection on lug 5 is so positioned with reference to the flange 2 of the frame that while the retaining member will lock the glass in position and against undue motion with respect to the parts, it does not apply any pressure to the glass which would tend to break it.

The retaining member can be released for removal of the lens either by pushing it out from under the lateral extension of the lug 5, which motion is permitted by the resiliency of the wire, or by disengaging either end from the lugs 3 or 4. The three point bearing for the wire retaining member 6, said points determining an arc of more than 180 degrees, produces effective lens holding means very simple in construction and operation.

Having fully described my invention, what I claim as new and desire to secure by Letters Patent of the United States is:

The combination with a lens, of a holder therefor comprising a supporting member having a peripheral recess forming a seat for the peripheral portion of the lens, and a curved resilient member for retaining the lens in the recess, the supporting member being provided with integral rearwardly extending spaced lugs, two of said lugs being provided with openings to receive the ends of the retaining member and the third lug being provided with a portion extending over the retaining member intermediate its ends.

In testimony whereof, I have hereunto set my hand this the 6th day of June, 1924.

JOHN A. AMOS.